United States Patent [19]

Yahata et al.

[11] Patent Number: 4,475,085

[45] Date of Patent: Oct. 2, 1984

[54] CLOCK SYNCHRONIZATION SIGNAL GENERATING CIRCUIT

[75] Inventors: Haruki Yahata, Fujisawa; Hideo Suzuki, Kawasaki; Shunsuke Honda, Yokohama, all of Japan

[73] Assignee: Tokyo Shibaura Denki Kabushiki Kaisha, Kawasaki, Japan

[21] Appl. No.: 305,712

[22] Filed: Sep. 25, 1981

[30] Foreign Application Priority Data

Sep. 25, 1980 [JP] Japan ................. 55-133561
Sep. 25, 1980 [JP] Japan ................. 55-133562
Sep. 25, 1980 [JP] Japan ................. 55-133563

[51] Int. Cl.³ .......................... H03K 3/01; H03K 1/17
[52] U.S. Cl. ....................................... 328/62; 328/63; 328/72; 328/55; 328/155
[58] Field of Search ............ 328/155, 25, 55, 63, 328/72, 62; 397/110, 115, 108, 148

[56] References Cited

U.S. PATENT DOCUMENTS

| | | | |
|---|---|---|---|
| 3,317,843 | 5/1967 | Emmons | 377/110 |
| 3,787,749 | 1/1974 | Uchida et al. | 328/72 |
| 3,893,033 | 7/1975 | Finch | 328/63 |
| 3,896,388 | 7/1975 | Hatsukano et al. | 328/63 |
| 3,983,498 | 9/1976 | Malek | 328/155 |
| 4,012,598 | 3/1977 | Wiley | 328/72 |
| 4,059,842 | 11/1977 | Meacham | 328/63 |
| 4,241,408 | 12/1980 | Gross | 377/110 |
| 4,242,639 | 12/1980 | Boone | 328/25 |
| 4,255,793 | 3/1981 | Nakamura | 328/63 |
| 4,309,662 | 1/1982 | Baudoux | 328/155 |
| 4,386,323 | 5/1983 | Jansen | 328/55 |

OTHER PUBLICATIONS

Electrical Design News, vol. 17, No. 6, Mar. 15, 1972, pp. 36-39, Denver (USA); D. A. Johnson.

Primary Examiner—John S. Heyman
Assistant Examiner—Timothy P. Callahan
Attorney, Agent, or Firm—Oblon, Fisher, Spivak, McClelland & Maier

[57] ABSTRACT

A clock synchronization signal generating circuit includes a clock synchronizing circuit having a scale variable counter for counting a source clock signal from a source clock generator and a control circuit for controlling the scale of counter responsive to the phase difference between an input clock signal supplied from a digital operation system and an output signal from the scale variable counter, and a clock circuit including a counter for counting in n-scale mode a source clock signal from the source clock generator. The scale variable counter is selectively set to (n−1)-, n- or (n+1)-scale mode responsive to the control signal from the control circuit to generate an output signal which is clock-synchronized with the input clock signal.

26 Claims, 15 Drawing Figures

CLOCK SYNCHRONIZATION SIGNAL GENERATING CIRCUIT

BACKGROUND OF THE INVENTION

The present invention relates to a clock synchronization signal generating circuit for achieving clock synchronization between digital operation systems such as data modem.

In the case where data are transferred from the transmitting section (master) in a digital operation system to the receiving section (slave) in another digital operation system, it is necessary to operate the data modem of synchronization type so as to accord or clock-synchronize bit repetitive frequency in the receiving section with that in the transmitting section. In order to establish clock synchronization between digital operation systems which are in master and slave relation, a clock signal generated through the voltage controlled oscillator (VCO) which is formed of analog circuits in the slave system is automatically adjusted responsive to a clock signal employed in the master system to thereby accord these clock signals in master and slave systems with each other.

As the technique of processing digital data and manufacturing LSI has been developed these days, the frequency variable oscillator circuit of digital type is often used instead of analog VCO. Different from the analog VCO, the digital frequency variable oscillator circuit can not change the instantaneous frequency continuously and is intended to accord in frequency the clock signal in the slave system with that in the master system by extracting or inserting one clock pulse from or into the clock output signal for every constant time period.

As usually well known, the data modem of synchronization type has the transmitting section which operates as master unit and the receiving section which operates as slave unit, and can carry out master and slave operations simultaneously or selectively. It is advantageous in this data modem of synchronization type that as many circuits as possible are designed to be used commonly in master and slave units. It is also advantageous that master and slave units in the data modem are driven by the same clock signal. However, as will be later described in detail referring to FIGS. 1 and 2, it is necessary in the conventional clock synchronizing method that a specific clock generator is arranged in master and slave units in each operation system for the purpose of selectively operating two operation systems in master and slave modes and always clock-synchronizing the slave system with the master system.

SUMMARY OF THE INVENTION

The object of the present invention is to provide a clock synchronization signal generating circuit capable of achieving good clock synchronizing operation between digital operation systems even when digital operation systems operate as master or slave system.

According to an embodiment of the present invention is provided a clock synchronization signal generating circuit comprising a source clock generating means, variable frequency dividing means for dividing the frequency of a source clock signal from the source clock generating means by a frequency dividing factor of N variable in a range of $n1 \geq N \geq n2$ where n1, n2, and N are positive integers and $n1 > n2$, a control means for controlling the frequency dividing factor of variable frequency dividing means to clock-synchronize an output signal from the variable frequency dividing means with an input clock signal responsive to the phase relation between the input clock signal and the output signal from the variable frequency dividing means, and frequency dividing means for dividing the frequency of the source clock signal by a frequency dividing factor of n3 wherein $n1 > n3 > n2$.

In the case where the operation of first digital operation system which is set to master mode is clock-synchronized with that of second digital operation system which is set to slave mode, an input signal in synchronism with a signal obtained by dividing the frequency of a first source clock signal by a frequency dividing factor of (N+1) is supplied from the clock circuit in the first digital operation system to the clock synchronizing circuit in the second digital operation system. On the other hand, the clock synchronizing circuit in the second digital operation system is controlled so as to selectively frequency-divide a second source clock signal by a frequency dividing factor of N or (N+2), for example, according to the phase difference between the input clock signal and the second source clock signal. A relation of $N < (N+1) < (N+2)$ is thus obtained and the operation of second digital operation system can be excellently clock-synchronized with that of first digital operation system by setting the frequency of first source clock signal substantially equal to that of second source clock signal.

According to another embodiment of the present invention is provided a clock synchronization signal generating circuit comprising a source clock generating means, variable frequency dividing means for dividing the frequency of a source clock signal from the source clock generating means by a frequency dividing factor of N variable in a range of $n1 \geq N \geq n2$ wherein n1, n2 and N are positive integers and $n1 > n2$, and control means for controlling the dividing factor of variable frequency dividing means in first control mode to clock-synchronize an output signal of variable frequency dividing means with an input clock signal according to the input clock signal and the source clock signal from the source clock generating means and for controlling the frequency dividing factor of variable frequency dividing means in second control mode to cause the variable frequency dividing means to frequency-divide the source clock signal by a frequency dividing factor of n3 wherein $n1 > n3 > n2$.

According to the present invention, an input clock signal in synchronism with a signal obtained by selectively dividing the first source clock signal by selectively frequency dividing factors of N and (N+1), for example, or by frequency dividing the first source clock signal substantially by a frequency dividing factor of (N+M) wherein $0 < M < 1$ is supplied from the clock circuit in the first digital operation system which is set to master mode to the clock synchronizing circuit in the second digital operation system which is set to slave mode. On the other hand, the clock synchronizing circuit in the second digital operation system is controlled so as to selectively frequency-divide the second source clock signal by the dividing factor of N or (N+1), for example, according to the phase difference between the input clock signal and the second source clock signal. A relation of $N < (N+M) < (N+1)$ is thus obtained and the operation of second digital operation system can be excellently clock-synchronized with that of first digital operation system by setting the frequency of first source clock signal substantially equal to that of second source clock signal.

DETAILED DESCRIPTION OF THE PREFERRED EMBODIMENTS

Figure 1:
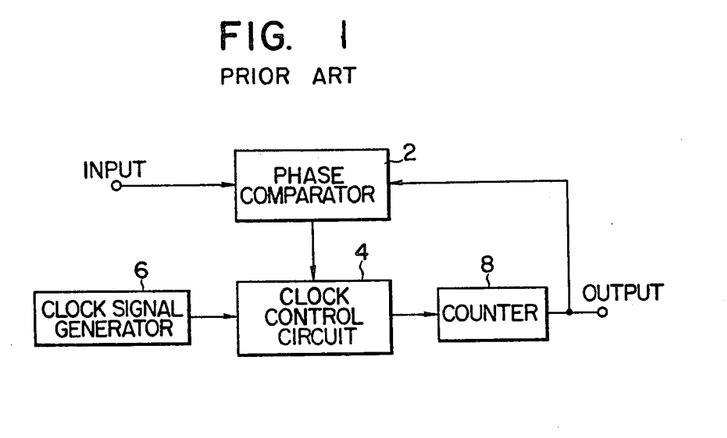
FIG. 1 is a block diagram showing the conventional clock synchronizing circuit.

FIG. 1 shows a conventional clock synchronizing circuit of digital type which is formed as a phase locked loop. This clock synchronizing circuit includes a phase comparator 2 for comparing phases of input signals, a clock control circuit 4 for controlling, responsive to an output signal from the phase comparator 2, the clock signal from a clock signal generator 6, and a quaternary or four-scale counter 8 for counting an output signal from the clock control circuit 4 and producing an output signal of high level when it takes one of four counting values "0" to "3", for example, a counting value "0".

Figure 2:
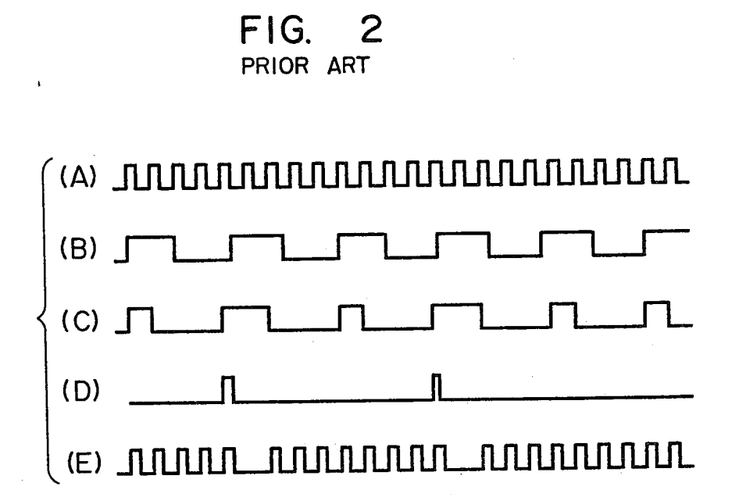
FIG. 2 shows signal waveforms for illustrating the operation of clock synchronizing circuit shown in FIG. 1.

The clock signal generator 6 generates a source clock signal shown in FIG. 2(A). The phase comparator 2 compares an input clock signal supplied from the master system and shown in FIG. 2(B) with an output clock signal generated through the counter 8 and shown in FIG. 2(C), for example, and generates an output pulse signal shown in FIG. 2(D) when clock signals shown in FIGS. 2(B) and 2(C) are of low and high levels, respectively. The clock control circuit 4 extracts a pulse which will be next generated from the clock signal generator 6 responsive to an output pulse supplied from the phase comparator 2 and generates a pulse signal shown in FIG. 2(E). The counter 8 counts output pulses from the clock control circuit 4 and generates a high level signal shown in FIG. 2(C) when its count is "0" while a low level signal when its count is "1" to "3". As a result, an output clock signal having substantially the same frequency as that of an input clock signal shown in FIG. 2(B) can be obtained from the counter 8 as shown in FIG. 2(C).

In the case of clock synchronizing circuit of this type, the variable range of frequency $f_i$ of input clock signal is determined by a constant frequency $f_c$ of source clock signal from the clock signal generator 6. In the clock synchronizing circuit shown in FIG. 1, the frequency $f_i$ of input clock signal is variable in a range shown by the following expression:

$$f_c/5 \leq f_i \leq f_c/4 \qquad (1)$$

Assume now that a first operation system which uses a source clock signal of frequency $f_{c1}$ as reference timing signal used for processing operation is operated as master system and a second operation system which uses a source clock signal of frequency $f_{c2}$ is operated as slave system. The master system carries out one cycle processing operation at every predetermined number of reference clock pulses or every four clock pulses, for example, and supplies the clock signal shown in FIG. 2(B) to the slave system. Between the frequency $f_{c1}$ of source clock signal employed in the master system and the frequency $f_i$ of input clock signal supplied to the slave system is established a relation expressed by the following equation:

$$f_i = f_{c1}/4 \qquad (2)$$

Therefore, for the purpose of clock-synchronizing the input signal supplied to the slave system with the source clock signal employed in the slave system, it is necessary to meet the following condition:

$$f_{c2}/5 \leq f_{c1}/4 \leq f_{c2}/4 \qquad (3)$$

In another case where the second operation system is operated as master system and the first operation system as slave system, it is required that the following condition is satisfied to clock-synchronize the input signal ($f_{c2}/4$) supplied to the slave system with the source clock signal ($f_{c1}$) employed in the slave system:

$$f_{c1}/5 \leq f_{c2}/4 \leq f_{c1}/4 \qquad (4)$$

In order to meet conditional expressions (3) and (4) at the same time, it is required to make equal frequencies $f_{c1}$ and $f_{c2}$ of source clock signals used in master and slave systems. However, as long as first and second operation systems are provided with different clock signal generators, it is extremely difficult to meet this requirement. Therefore, in order to achieve a good clock synchronization in the conventional clock synchronizing circuit, it is required that two source clock signal generators are selectively connected to the digital operation system because source clock signals of different frequencies are employed when the digital operation system is operated in master mode and slave mode.

Figure 3:
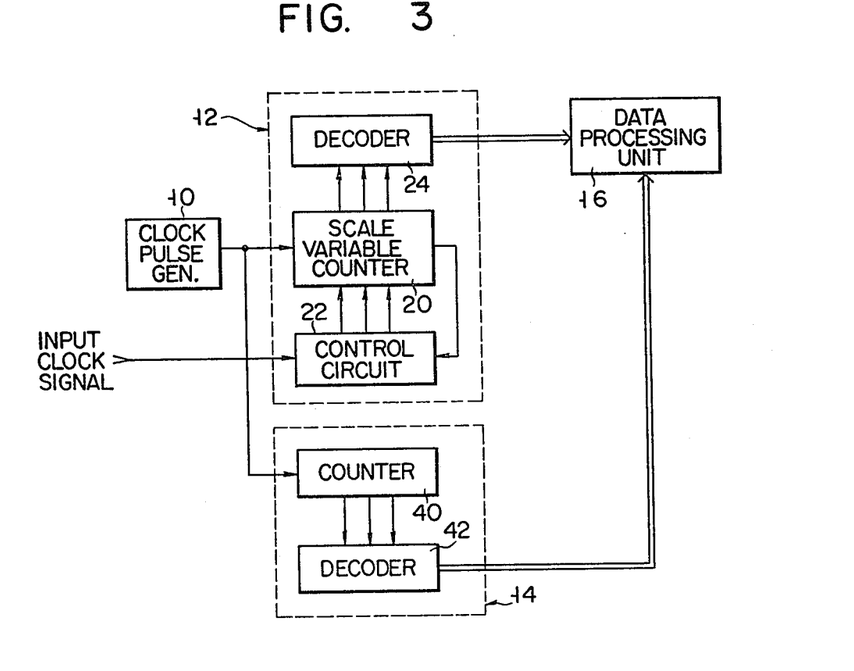
FIG. 3 is a block diagram showing a clock synchronization signal generating circuit according to an embodiment of the present invention.

FIG. 3 shows a digital operation system using a clock synchronization signal generating circuit of the present invention. The clock synchronization signal generating circuit includes a clock pulse generator 10, a clock synchronizing circuit 12 and a clock circuit 14 both supplying, responsive to a clock pulse signal from the clock pulse generator 10, a clock synchronizing signal and clock signal to a data processing unit 16 as timing signals. A control clock signal is supplied from the clock circuit 14 to the data processing unit 16 to render the digital operation system operative in master mode and a control clock signal is supplied from the clock synchronizing circuit 12 to the data processing unit 16 to render the digital operation system operative in slave mode.

The clock synchronizing circuit 12 includes a scale variable counter 20 for counting clock pulses from the clock pulse generator 10, a control circuit 22 for controlling the scale variable counter 20 in such a way that a clock signal in synchronism with the source clock signal employed in another digital operation system operating in master mode is accorded in frequency with an output signal of scale variable counter 20, and a decoder 24 for decoding the output signal of scale variable counter 20 to supply it to the data processing unit 16 as control clock signal. The clock circuit 14 includes a counter 40 for counting clock pulses from the clock pulse generator 10, and a decoder 42 for decoding the output signal of counter 40 to supply it to the data processing unit 16 as control clock signal.

Figure 4:
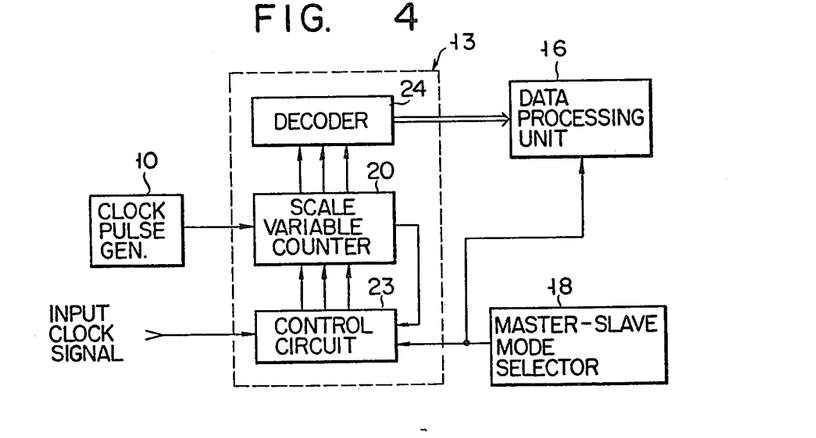
FIG. 4 is a block diagram showing another embodiment of clock synchronization signal generating circuit according to the present invention.

The digital operation system shown in FIG. 3 can be used as full duplex modem where the data processing unit has the master (modulation) section and slave (demodulation) section separately. Namely, the digital operation system can be operated in master-slave mode responsive to control clock signals applied from decoders 24 and 42. However, in the case of digital operation system operating selectively in master or slave mode as in the half-duplex modem, the counter 40 and decoder 42 can be omitted as shown in FIG. 4. A clock synchronization signal generating circuit 13 employed in the digital operation system of FIG. 4 is substantially the same in arrangement as the one shown in FIG. 3 except that a control circuit 23 whose operation is determined responsive to master-slave mode selection signals produced from a master-slave mode selection circuit 18 is used instead of control circuit 22. When the digital operation system operates in master mode, for example, the operation of control circuit 23 is stopped responsive to the mode selection signal produced from the mode selection circuit 18, so that the counter 20 may carry out counting operation without changing its scale. When the digital operation system operates in slave mode, the control circuit 23 is rendered operative responsive to the mode selection signal produced from the mode selection circuit 18, so that the scale of counter 20 can be changed according to the control signal supplied from the control circuit 23.

In the case of digital operation system shown in FIG. 4, mode selection signals are generated through the mode selection circuit 18, but may be generated through the data processing unit 16 according to the programming operation of data processing unit 16 in the digital operation system.

Figure 5:
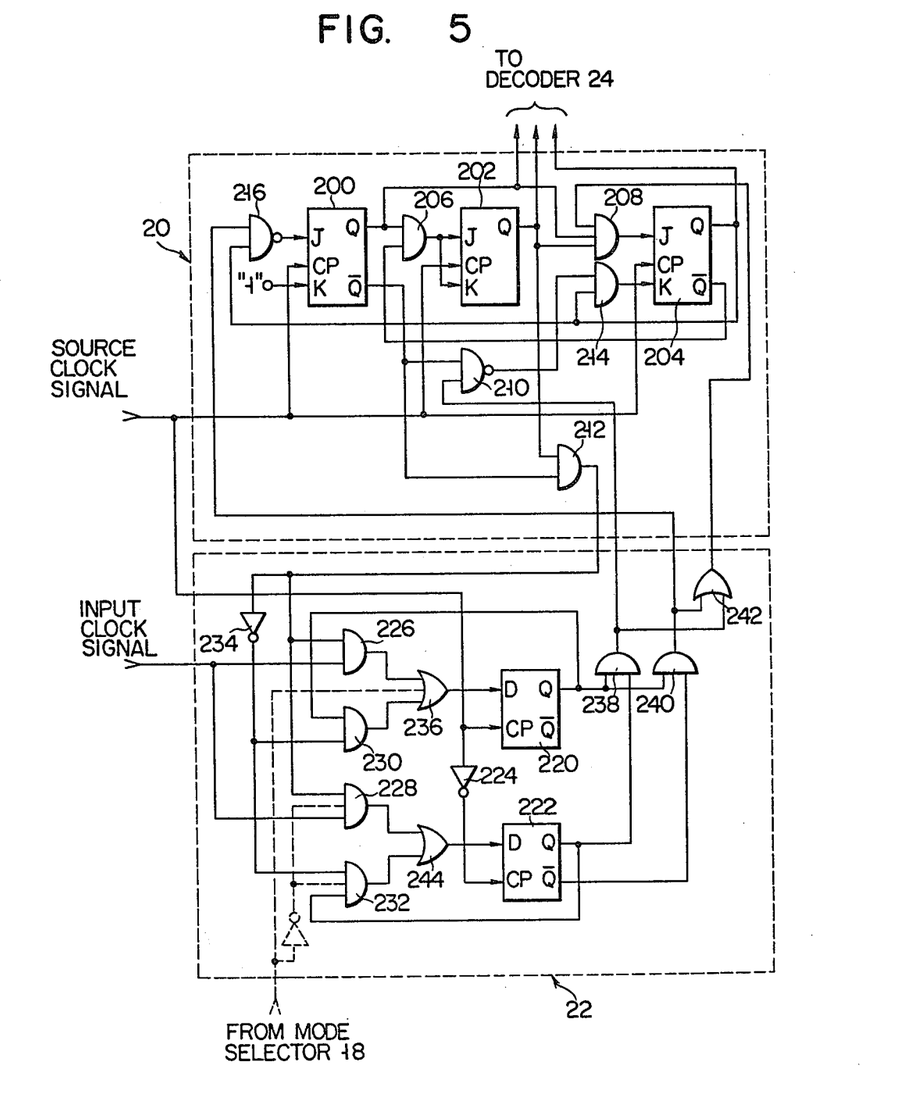
FIG. 5 is a detailed circuit diagram showing a scale variable counter and a control circuit in the clock synchronization signal generating circuit shown in FIG. 3.

FIG. 5 shows a detailed circuit diagram of scale variable counter 20 and control circuit 22 in the clock synchronizing circuit 12 shown in FIG. 3. The scale variable counter 20 has J-K flip-flop circuits 200, 202 and 204 which receive through their clock terminals a source clock signal generated from the clock pulse generator 10. The K input terminal of the flip-flop circuit 200 is connected to receive a level signal, the Q output terminal thereof to first input terminals of AND gates 206 and 208, and the $\overline{Q}$ output terminal thereof to first input terminals of a NAND gate 210 and an AND gate 212. J and K input terminals of the flip-flop circuit 202 are connected to the output terminal of AND gate 206, and the Q output terminal thereof to second input terminals of AND gates 208 and 212. The J input terminal of flip-flop 204 is connected to the output terminal of AND gate 208, the K input terminal thereof to the output terminal of an AND gate 214 whose first input terminal is connected to the outer terminal of NAND gate 210, the Q output terminal thereof to the second input terminal of AND gate 214 and to the first input terminal of NAND gate 216 whose output terminal is connected to the J input terminal of flip-flop circuit 200, and the $\overline{Q}$ output terminal thereof to the second input terminal of AND gate 206.

The control circuit 22 has a D type flip-flop circuit 220 which receives through its clock terminal the source clock signal applied from the clock pulse generator 10, a D-type flip-flop circuit 222 whose clock terminal receives via an inverter 224 the source clock signal, AND gates 226 and 228 whose first input terminals are connected to the output terminal of AND gate 212 in the counter 20, and AND gates 230 and 232 whose first input terminals are connected via an inverter 234 to the output terminal of AND gate 212. The D input terminal of flip-flop circuit 220 is connected to the output terminal of an OR gate 236 which is connected to output terminals of AND gates 226 and 230, and the Q output terminal thereof to first input terminals of AND gates 238 and 240 and to the second input terminal of AND gate 230. Output terminals of AND gates 238 and 240 are connected to second input terminals of NAND gates 210 and 216, respectively, and to the input terminals of an OR gate 242. The output terminal of OR gate 242 is connected to the third input terminal of AND gate 208 in the counter 20. The D input terminal of flip-flop circuit 222 is connected to the output terminal of an OR gate 244 which is connected to output terminals of AND gates 228 and 232, the Q output terminal thereof to second input terminals of AND gates 232 and 238, and the $\overline{Q}$ output terminal thereof to the second input terminal of AND gate 240. To second input terminals of AND gates 226 and 228 is supplied an input clock signal in synchronism with the source clock signal used in a different operation system which operates in master mode.

The operating mode of counter 20 is determined responsive to output signals supplied from AND gates 238, 240 and OR gate 242 in the control circuit 22. Namely, the counter 20 operates as a 6-scale counter or 1/6 frequency divider when the output signal of AND gate 238 is at a level "1", as a 5-scale counter or 1/5 frequency divider when the output signal of AND gate 240 is at a level "1", and as a 4-scale counter or ¼ frequency divider when output signals of AND gates 238 and 240 are at a level "0".

The operation of clock synchronizing circuit shown in FIG. 5 will be now described with reference to signal waveforms shown in FIG. 6.

Figure 6:
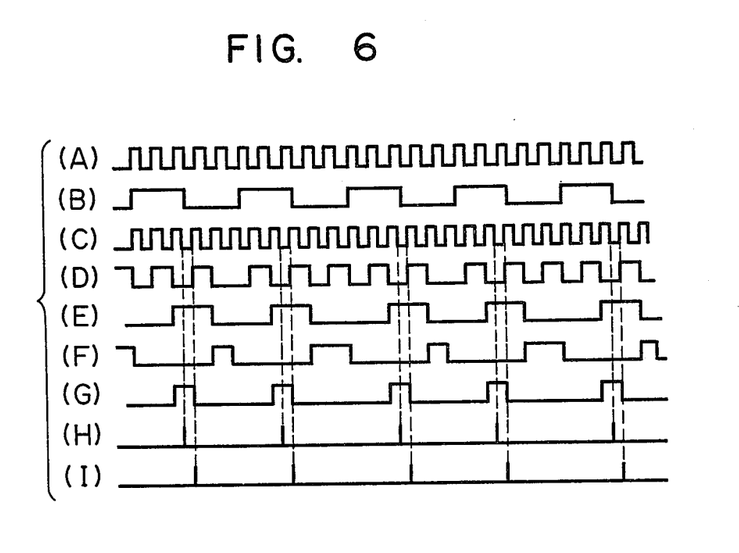
FIGS. 6 and 7 show signal waveforms for illustrating the operations of scale variable counter and control circuit shown in FIG. 5.

FIG. 6(A) shows a source clock signal used in a second digital operation system in communication with the digital operation system of FIG. 3 or FIG. 4, FIG. 6(B) an input clock signal synchronized with the source clock signal shown in FIG. 6(A) and supplied to the control circuit 2, and FIG. 6(C) a source clock signal generated through the clock pulse generator 10 (FIG. 3). The source clock signal generated through the clock pulse generator 10 has a higher frequency than the source clock signal used in the second digital operation system. As apparent from FIGS. 6(A) and 6(B), the counter 40 of clock circuit 14 in each of digital operation systems operates as a quinary or 5-scale counter.

Suppose now that both of flip-flop circuits 220 and 222 are set. In this case, an output signal of level "1" is generated through the AND gate 238 and the counter 20 operates as a 6-scale counter. Namely, Q output signals as partly shown in FIGS. 6(D), 6(E) and 6(F) are obtained through flip-flop circuits 200, 202 and 204, respectively. In other words, Q output signals of these flip-flop circuits 200, 202 and 204 are changed, as shown in the following Table I, responsive to a source clock pulse signal CP.

TABLE I

| CLOCK | q | q + 1 | q + 2 | q + 3 | q + 4 | q + 5 |
|---|---|---|---|---|---|---|
| Q OUTPUT (F · F 200) | 0 | 1 | 0 | 1 | 0 | 1 |
| Q OUTPUT (F · F 202) | 0 | 0 | 1 | 1 | 0 | 0 |
| Q OUTPUT (F · F 204) | 0 | 0 | 0 | 0 | 1 | 1 |

When Q output signals of levels "0" and "1" are generated through flip-flop circuits 200 and 202, respectively, a high level signal is also generated in this case through the AND gate 212 as shown in FIG. 6(G).

Only when a high level output signal is generated through the AND gate 212 and the input clock signal [FIG. 6(B)] is at a low level, the flip-flop circuit 220 produces a Q output signal of low level in response to the leading edge of source clock pulse. It is when a high level output signal is generated through the AND gate 212 and the leading edge of source clock pulse is supplied to the flip-flop circuit 220 in the case where the input clock signal is in high level that the output state of flip-flop circuit 220 is changed from level "0" to level "1". On the other hand, it is when a high level signal is generated through the AND gate 212 and the trailing edge of source clock pulse is applied to the flip-flop circuit 222 in the case where the input clock signal is at a low level that the Q output signal of flip-flop circuit 222 is changed from high level to low level. It is also when a high level output signal is generated through the AND gate 212 and the trailing edge of source clock pulse is applied to the flip-flop circuit 222 in the case where the input clock signal is at a high level that the Q output signal of flip-flop circuit 222 is changed from low level to high level.

As described above, the output state of flip-flop circuit 220 is set at a high or low level responsive to the high or low level of input clock signal at a timing shown in FIG. 6(H) and the output state of flip-flop circuit 222 is set at a high or low level responsive to the high or low level of input clock signal at a timing shown in FIG. 6(I) in each counting cycle. Therefore, when it is detected that input clock signals shown in FIG. 6(B) are both at a high level at timings shown in FIGS. 6(H) and 6(I), the counter 20 is set to operate as a 6-scale counter, when it is detected that input clock signals are at high and low levels, respectively, at timings shown in FIGS. 6(H) and 6(I), the counter 20 is set to operate as a 5-scale counter, and when it is detected that input clock signals are at a low level at timings shown in FIGS. 6(H) and 6(I), the counter 20 is set to operate as a 4-scale counter. The level of input clock signal is detected at timings shown in FIGS. 6(H) and 6(I) every counting cycle as described above and the counting scale in a following counting cycle is determined according to the detected result.

Since it is assumed in the example shown in FIG. 6 that the input clock signal [FIG. 6(B)] obtained by dividing by 5 the frequency of the source clock signal [FIG. 6(A)] having a lower frequency than that of source clock signal [FIG. 6(C)] supplied from the clock pulse generator 10 is supplied to the control circuit 22, the scale variable counter 20 will be selectively set to operate in 5- or 6-scale counting mode responsive to the control signal supplied from the control circuit 22, thus supplying an output signal through flip-flop circuits 200, 202 and 204 to the decoder 24. The decoder 24 supplies to the data processing unit 16 an output clock signal defined by the output signal from the counter 20 and clock-synchronized with the input clock signal.

Figure 7:
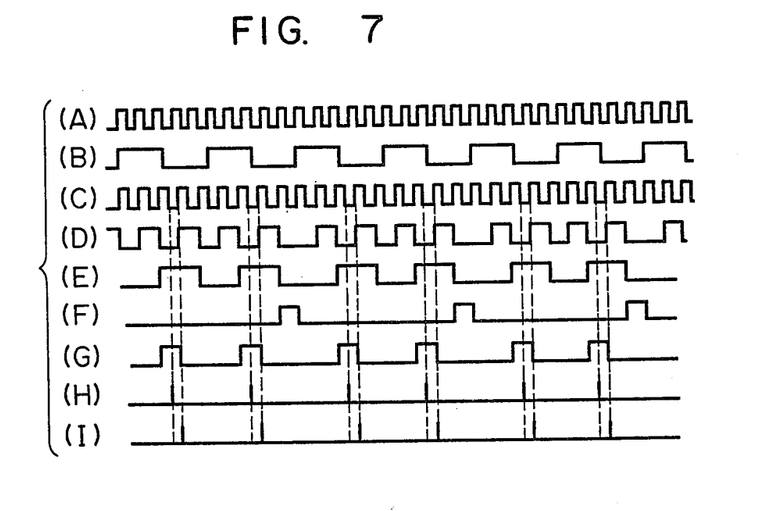

FIG. 7 shows a case where the input clock signal shown in FIG. 7(B) which is obtained by dividing by 5 the frequency of source clock signal shown in FIG. 7(A) and having a higher frequency than that of source clock signal supplied from the clock pulse generator 10 as shown in FIG. 7(C) is supplied to the control circuit 22. FIGS. 7(A) to 7(I) correspond to FIGS. 6(A) to 6(I). Therefore, the scale variable counter 20 is selectively set to operate in 5- or 4-scale counting mode responsive to the control signal from the control circuit 22 in this case, thus supplying an output signal through flip-flop circuits 200, 202 and 204 to the decoder 24.

The counter 20 and control circuit 22 shown in FIG. 5 can be employed in the clock synchronization signal generating circuit shown in FIG. 4. When the clock synchronization signal generating circuit shown in FIG. 4 is operated as a clock circuit, that is, in master mode, for example, the mode selector 18 may be connected to the control circuit 22 in such a way that a signal of level "1" from the mode selector 18 is supplied to the OR gate 236 and a signal of level "0" to AND gates 228 and 232. When the master mode is thus selected by the mode selector 18, Q output signals of flip-flop circuits 220 and 222 are set at high and low levels, respectively, and the counter 20 fixedly operates as a 5-scale counter. When the slave mode is selected by the mode selector 18, a signal of level "0" is supplied to the OR gate 236 while a signal of level "1" to AND gates 228 and 232, and the counter 20 is selectively set, as described above, to operate as a 4-, 5- or 6-scale counter according to a control signal from the control circuit 22.

Figure 8:
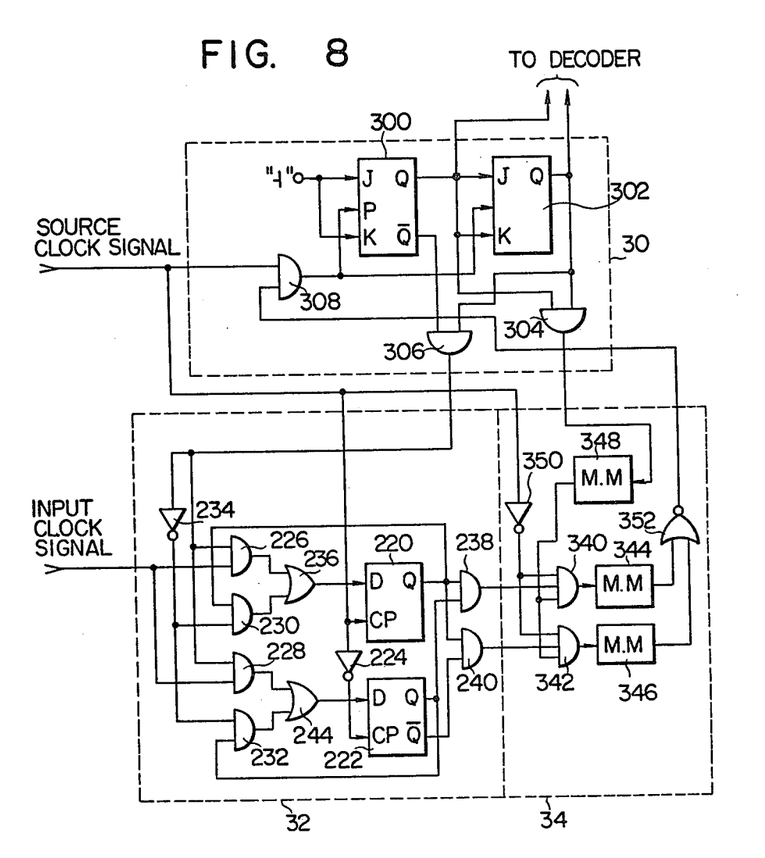
FIG. 8 is a circuit diagram showing a counter, control circuit and clock controlling circuit in a further embodiment of clock synchronization signal generating circuit according to the present invention.

FIG. 8 shows a clock synchronizing circuit in a clock synchronization signal generating circuit which is another embodiment of the present invention. The clock synchronizing circuit includes a 4-scale counter 30, a control circuit 32 whose arrangement is the same as that of control circuit 22 shown in FIG. 5, and a clock control circuit 34 for changing the frequency of source clock signal responsive to an output signal of control circuit 32. The 4-scale counter 30 includes J-K flip-flop circuits 300, 302, an AND gate 304 connected to Q output terminals of flip-flop circuits 300, 302, an AND gate 306 connected to the $\overline{Q}$ output terminal of flip-flop circuit 300 and to the Q output terminal of flip-flop circuit 302, and an AND gate 308 which receives the source clock signal through an input terminal and whose output terminal is connected to clock input terminals of flip-flop circuits 300, 302.

The control circuit 32 generates through AND gates 238 and 240 an output signal corresponding to the level of input clock signal in response to trailing and leading edges of a source clock signal while a high level signal is being generated through the AND gate 306.

The clock control circuit 34 includes AND gates 340 and 342 whose first input terminals are connected to output terminals of AND gates 238 and 240, respectively, monostable multivibrators 344 and 346 connected to output terminals of AND gates 340 and 342, and a monostable multivibrator 348 connected to the output terminal of AND gate 304. To second input terminals of AND gates 340 and 342 is supplied a source clock signal through an inverter 350 and to third input terminals thereof an output signal of monostable multivibrator 348. Output signals of monostable multivibrators 344 and 346 are supplied through a NOR gate 352 to the other input terminal of AND gate 308.

Figure 9:
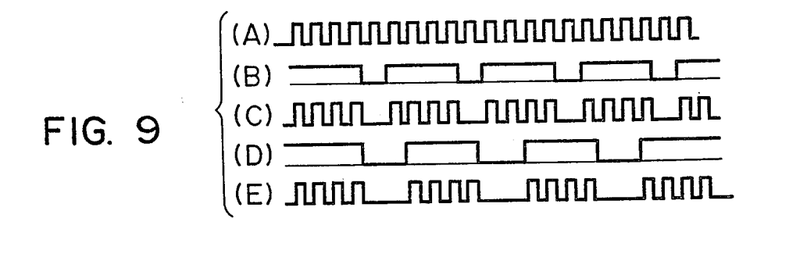
FIG. 9 shows signal waveforms for illustrating the operation of circuit shown in FIG. 8.

It is assumed in this embodiment that an input clock signal supplied to the control circuit 32 is a clock signal obtained by dividing by 5 a source clock signal (not shown) employed in a different operation system. Suppose now that Q output signals of flip-flop circuits 300 and 302 are set at levels "0" and "1", respectively, and levels of the input clock signal at timings at which trailing and leading edges of the source clock signal are generated at this time are detected to be at a level "0". In this case, a signal of low level is generated through AND gates 238 and 240, so that a signal of level "1" is generated through the NOR gate 352. To the counter 30 is therefore supplied the source clock signal shown in FIG. 9(A). Assume that levels of the input clock signal at trailing and leading edges of source clock signal generated when Q output signals of flip-flop circuits 300 and 302 are at levels "0" and "1", respectively, are detected to be at levels "1" and "0", respectively. In this case, signals of high and low levels are generated through AND gates 238 and 240. After Q output signals of flip-flop circuits 300 and 302 become at a level "1" to trigger the monostable multivibrator 348, the inverted signal of source clock signal triggers the monostable multivibrator 344 through the AND gate 340 causing the monostable multivibrator 344 to generate a high level signal over a predetermined time period. The signal shown in FIG. 9(B) is thus supplied from the NOR gate 352 to the AND gate 308. As a result, every fifth clock pulse in the source clock signal is removed and the clock signal shown in FIG. 9(C) is supplied to the counter 30. Now, assume that both levels of the input clock signal at trailing and leading edges of source clock signal generated when Q output signals of flip-flop circuits 300 and 302 become at levels "0" and "1", respectively, are detected to be "1". In this case, high level signals are generated through AND gates 238 and 240. After both of Q output signals of flip-flop circuits 300 and 302 become at a level "1", the inverted signal of source clock signal triggers monostable multivibrators 344 and 346 through AND gates 340 and 342 causing these monostable multivibrators 344 and 346 to generate high level signals over predetermined periods of time. The signal shown in FIG. 9(D) is thus supplied from the NOR gate 352 to the AND gate 308. As the result, every fifth and sixth clock pulses in the source clock signal are removed and the clock signal shown in FIG. 9(E) is supplied to the counter 30. In this example, the monostable multivibrator 348 produces a "1" level signal in response to the leading edge of a "1" level output signal from the AND gate 304 for a time substantially equal to one period of time of the source clock signal so as to define the timing at which monostable multivibrators 344 and 346 can be triggered.

The counter 30 and control circuit 32 shown in FIG. 8 can be employed in the clock synchronization signal generating circuit shown in FIG. 4. In a case where the clock synchronization signal generating circuit shown in FIG. 4 is operated as a clock circuit, that is, in master mode, for example, the mode selector 18 may be connected to the control circuit 32, as shown by the broken line in FIG. 5, in such a way that the signal of level "1" from the master-slave mode selector 18 is supplied to the OR gate 236 and the signal of level "0" to AND gates 228 and 232. When the master mode is thus selected by the mode selector 18, Q output signals of flip-flop circuits 220 and 222 are set at levels "1" and "0", respectively, the control signal shown in FIG. 9(B) is generated through the clock control circuit 34, and one clock pulse in every five source clock pulses is removed by the AND gate 308. When the slave mode is selected by the mode selector 18, a signal of level "0" is supplied to the OR gate 236 while a signal of level "1" to AND gates 228 and 232, and the clock control circuit 34 responds, as described above, to the control signal applied from the control circuit 32 so as to control the number of source clock pulses supplied from the source clock generating circuit to the counter 30.

Figure 10:
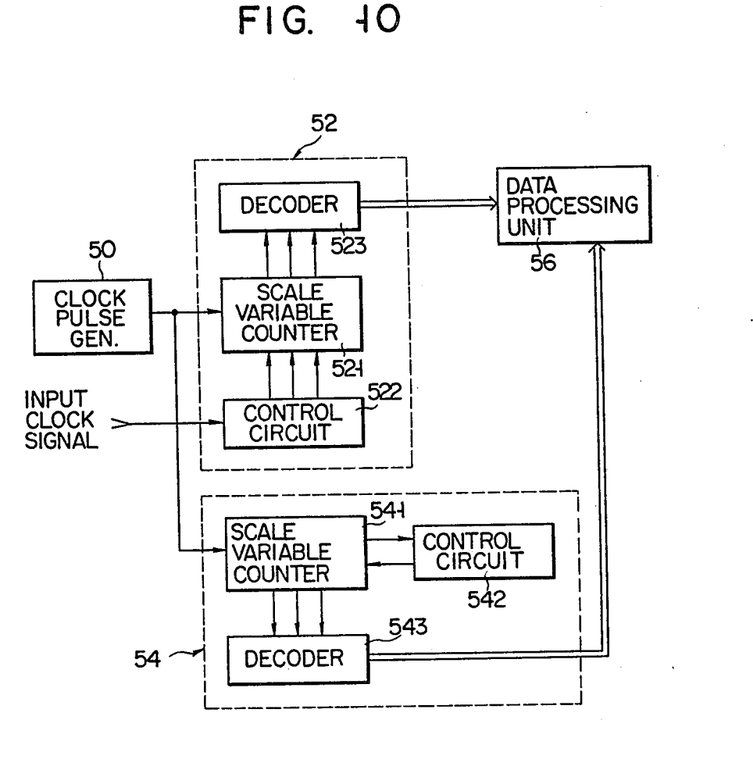
FIG. 10 is a block diagram showing a still further embodiment of clock synchronization signal generating circuit according to the present invention.

FIG. 10 shows a clock synchronization signal generating circuit which is a further embodiment of the present invention. The clock synchronization signal generating circuit includes a clock pulse generator 50, and a clock synchronizing circuit 52 and a clock circuit 54 which respectively supply, in response to a clock pulse signal from the clock pulse generator 50, clock synchronizing signal and clock signal to a data processing unit 56 as timing signals.

The clock synchronizing circuit 52 includes a scale variable counter 521 for counting clock pulses from the clock pulse generator 50, a control circuit 522 for controlling the scale variable counter 521 in such a way that a clock signal in synchronism with the source clock signal employed in the digital operation system operating in master mode is matched in frequency with the output signal of scale variable counter 521, and a decoder 523 for decoding the output signal of scale variable counter 521 to supply the control clock signal to the data processing unit 56. The clock circuit 54 includes a scale variable counter 541 for counting source clock pulses from the clock pulse generator 50, a control circuit 542 for controlling the scale of scale variable counter 541, and a decoder 543 for decoding the output signal of counter 541 to supply it to the data processing unit 56 as control clock signal.

When the scale variable counter 521 is selectively controlled by the control circuit 522 to operate in 4- or 5-scale counting mode in this embodiment, for example, the scale variable counter 541 can be operated in 4- or 5-scale counting mode responsive to a control signal from the control circuit 542.

Figure 11:
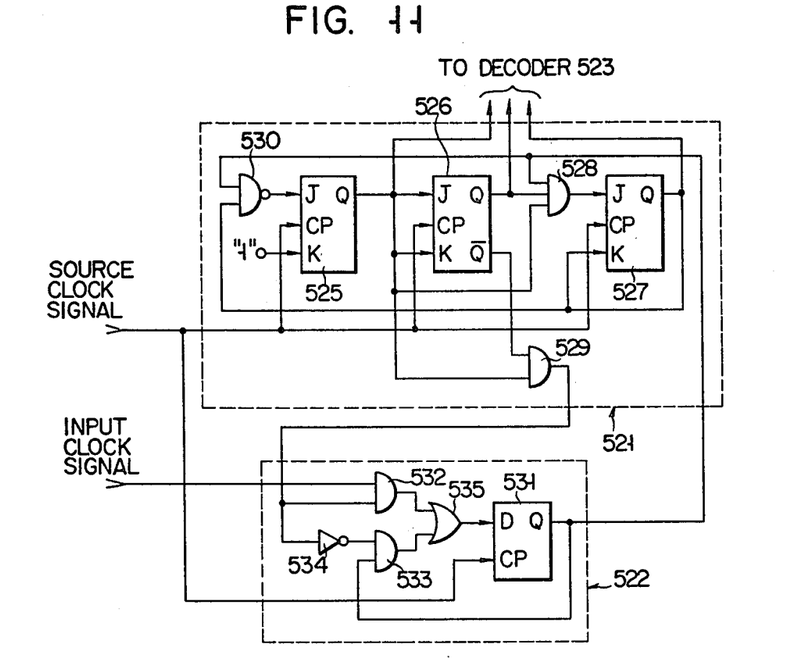
FIG. 11 is a detailed circuit diagram showing a scale variable counter and control circuit shown in FIG. 10.

FIG. 11 shows a detailed circuit diagram of scale variable counter 521 and control circuit 522 in the clock synchronizing circuit 52 shown in FIG. 10. The scale variable counter 521 includes J-K flip-flop circuits 525 to 527 which are driven by the source clock signal. The Q output terminal of flip-flop circuit 525 is connected to J and K input terminals of flip-flop circuit 526 and to first input terminals of AND gates 528 and 529. The Q and $\overline{Q}$ output terminals of flip-flop circuit 526 are connected to second input terminals of AND gates 528 and 529, respectively. The Q output terminal of flip-flop circuit 527 is connected to the K input terminal thereof and to the first input terminal of a NAND gate 530 whose output terminal is connected to the J input terminal of flip-flop circuit 525, and the J input terminal thereof to the output terminal of AND gate 528.

The control circuit 522 has a D-type flip-flop circuit 531 which is driven by a source clock signal, and an AND gate 532 which receives the input clock signal at its first input terminal. The Q output terminal of flip-flop circuit 531 is connected to the first input terminal of an AND gate 533 and to the third input terminal of AND gate 528 and to the second input terminal of NAND gate 530 in the counter 521. The second input terminal of AND gate 532 is connected to the output terminal of AND gate 529 and the second input terminal of AND gate 533 to the output terminal of AND gate 529 via an inverter 534. Output terminals of these AND gates 532 and 533 are connected to the D input terminal of flip-flop circuit 531 via an OR gate 535.

Figure 12:
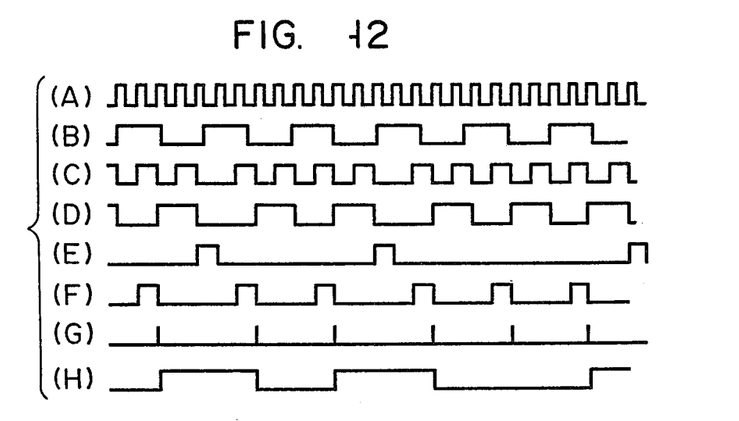
FIG. 12 shows signal waveforms for illustrating the operation of clock synchronizing circuit shown in FIGS. 10 and 11.

The counter 521 counts the source clock signal shown in FIG. 12(A) in 4-scale counting mode when a low level signal is generated through the control circuit 522 but counts it in 5-scale counting mode when a high level signal is generated through the control circuit 522.

Assume now that the flip-flop circuit 531 generates a Q output signal of high level and the counter 521 operates in 5-scale counting mode. Q output signals shown in FIGS. 12(C) to 12(E) and applied from flip-flop circuits 525 to 527 change as shown in the following Table II responsive to the source clock signal in this case.

TABLE II

| CLOCK | q | q + 1 | q + 2 | q + 3 | q + 4 |
| --- | --- | --- | --- | --- | --- |
| Q (F · F 525) | 0 | 1 | 0 | 1 | 0 |
| Q (F · F 526) | 0 | 0 | 1 | 1 | 0 |
| Q (F · F 527) | 0 | 0 | 0 | 0 | 1 |

When Q output signals of flip-flop circuits 525 and 526 become at levels "1" and "0", respectively, the output signal shown in FIG. 12(F) is generated through the AND gate 529. Then, the output state of flip-flop circuit 531 is controlled at the timing shown in FIG. 12(G) and responsive to the leading edge of source clock pulse applied to the flip-flop circuit 531 when the high level signal is being generated through the AND gate 529. Namely, if the input clock signal shown in FIG. 12(B) is at a high level when the leading edge of this source clock pulse is generated, the Q output signal of high level shown in FIG. 12(H) is generated through the flip-flop circuit 531 and if the input clock signal is at a low level, the Q output signal of low level is generated through the flip-flop circuit 531.

As described above, the level of input clock signal is checked one time in each counting cycle under 4- or 5-scale counting mode, and the counting scale in a following counting cycle is determined according to the level detected.

Figure 13:
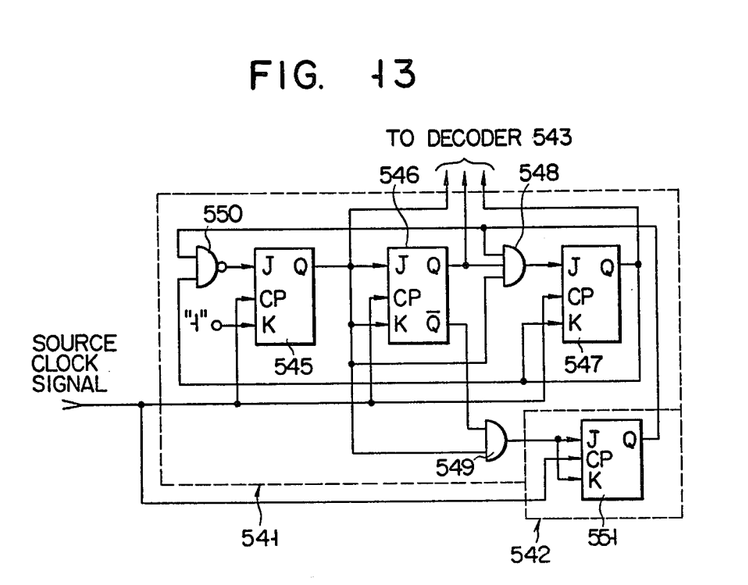
FIG. 13 is a detailed circuit diagram showing the clock circuit shown in FIG. 10.

FIG. 13 shows a detailed circuit diagram of scale variable counter 541 and control circuit 542 in the clock circuit shown in FIG. 10. The scale variable counter 541 is arranged similarly to the counter 521 shown in FIG. 11 and includes flip-flop circuits 545 to 547 corresponding to the circuits 525 to 527 and AND gates 548, 549 and a NAND gate 550 corresponding to those gates 528, 529 and 530. The control circuit 542 includes a J-K flip-flop circuit 551 whose J and K input terminals are connected to the output terminal of AND gate 549 and whose Q output terminal to input terminals of AND gate 548 and NAND gate 550. The counter 541 operates selectively in 4- or 5-scale counting mode according to the level of Q output signal from the flip-flop circuit 551. On the other hand, the flip-flop circuit 551 inverts the level of Q output signal in response to the source clock pulse while Q output signals of high and low levels are being generated from the flip-flop circuits 545 and 546, respectively. The counting mode of counter 541 is thus changed to either 4- or 5-scale counting mode in every counting cycle, so that an output signal corresponding to a frequency-divided signal obtained by dividing the frequency of source clock signal substantially by 4.5 is supplied from the counter 541 to the decoder 543.

In the case of embodiments shown in FIGS. 10 to 13, to the clock synchronizing circuit 52 in the digital operation system is supplied from the different digital operation system an input clock signal in synchronism with a signal obtained by dividing the source clock signal substantially by 4.5. An output signal from the clock synchronizing circuit 52 can be therefore synchronized with an input clock signal supplied from a different digital operation system. Where the source clock signal used in the digital operation system of FIG. 10 is higher than that used in the different digital operation system, the counter 521 in the clock synchronizing circuit 52 more often operates in 5-scale counting mode than in 4-scale counting mode, but in 4-scale counting mode than in 5-scale counting mode in the opposite case.

When the scale variable counter in the clock synchronizing circuit carries out counting operation with a different scale in above-mentioned embodiments, combination or combinations of output codes except those obtained from the counter operating with the smallest scale may be obtained from the counter when it carries out counting operation with a greater scale, and it is necessary to make invalid the effect of this different combination or combinations of output codes. The scale variable counter 521 shown in FIG. 11, for example, can operate in 4- or 5-scale counting mode and when it carries out counting operation in 5-scale counting mode, output signals of "0", "0" and "1" are obtained through flip-flop circuits 525 to 527, but when it carries out counting operation in 4-scale counting mode, output signals of this combination are not obtained. It is therefore necessary to prevent the data processing unit 56 (FIG. 10) from operating in response to output signals of such combination as "0", "0" and "1" which are generated in quinary mode.

Figure 14:
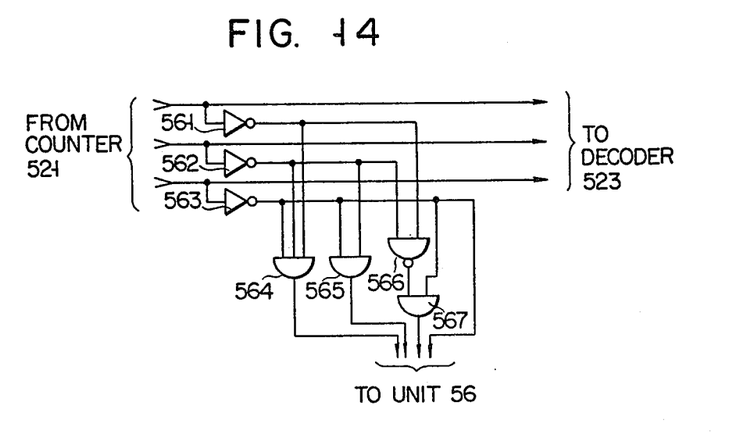
FIG. 14 is a circuit diagram showing a control circuit for controlling the operation of data processing unit responsive to an output signal of counter shown in FIG. 11.

FIG. 14 shows a circuit section of part of a decoder designed to meet this requirement. The circuit section includes inverters 561 to 563 connected to Q output terminals of flip-flop circuits 525 to 527 in the counter 521, an AND gate 564 having input terminals connected to output terminals of inverters 561 to 563, an AND gate 565 connected to output terminals of inverters 562 and 563, a NAND gate 566 connected to output terminals of inverters 561 and 562, and an AND gate 567 connected to output terminals of NAND gate 566 and inverter 563. Output signals of the circuit section are derived out from output terminals of AND gates 564, 565, 567 and inverter 563. When Q output signals of "0", "0" and "1" are generated from flip-flop circuits 525 to 527, for example, output signals "0, 0, 0, 0" are supplied from the circuit section shown in FIG. 14 to the data processing unit 56 to temporarily stop the operation of data processing unit 56.

Although the present invention has been described referring to embodiments, it should be understood that the present invention is not limited to these embodiments and that various modifications are possible. It has been described in embodiments of the present invention that the scale variable counter 20, 521 or 541 operates in 4-, 5- or 6-scale counting mode, but more timing pulses are practically needed in one data processing cycle in the digital operation system. Therefore, it can be arranged that these counters are selectively set to operate in 256-scale, 257-scale or 258-scale counting mode, for example.

The average value of scales of counter 541 in the clock circuit 54 is set to be larger than 4 but smaller than 5 in embodiments shown in FIGS. 10 to 13 and the counter 541 is therefore controlled to operate in 4- or 5-scale counting mode. However, the counter 541 may be controlled to operate in 4- or 6-scale counting mode, for example. After the counter 541 is operated in 4-scale counting mode over four counting cycles, for example, it is operated in 6-scale counting mode in one counting cycle, thus allowing counting operation to be carried out substantially in 4.4-scale counting mode so as to achieve good clock synchronization.

Figure 15:
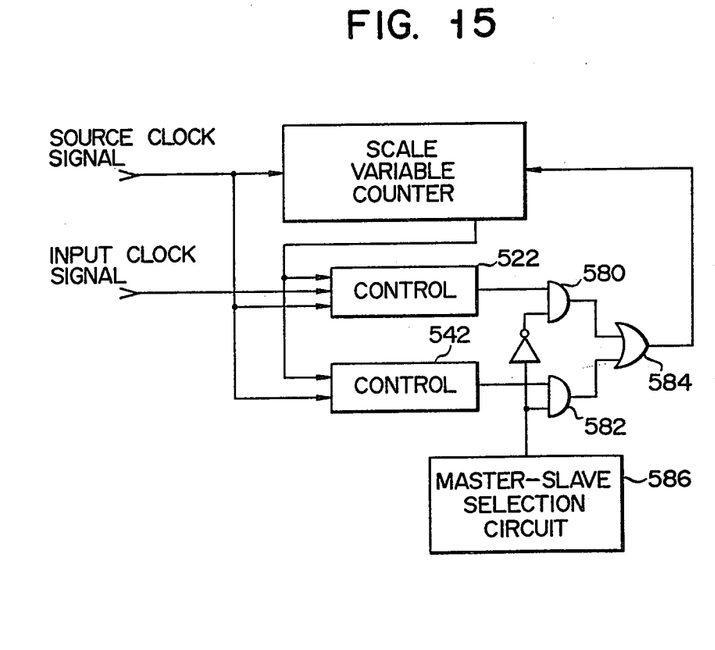
FIG. 15 shows a modification of a clock synchronization signal generating circuit of FIG. 10.

Further, common circuit sections in clock synchronizing circuit 52 and clock circuit 54 of FIG. 10 can be combined to form a clock synchronization signal generating circuit which can be selectively set in master or slave mode by a master-slave mode selector as explained in FIG. 4. As is clearly understood from FIGS. 11 and 13, the scale variable counters 521 and 541 are the same in construction and the control circuits 522 and 542 are different from each other. Therefore, it is possible to use the scale variable counter 521, for example, and couple the control circuits 522 and 542 to the scale variable counter 521 as shown in FIG. 15. That is, output terminals of the control circuits 522 and 542 are connected to AND gates 580 and 582 whose output terminals are connected to the scale variable counter 521 through an OR gate 584. The AND gates 580 and 582 are controlled in response to a mode selection signal from a master-slave mode selector 586 so that output signals from the control circuits 522 and 542 are made invalid and valid, respectively, in master mode, and valid and invalid, respectively, in slave mode.

What we claim is:

1. A clock synchronization signal generating circuit comprising:
    a source clock generating means;
    a clock synchronizing circuit including a first frequency dividing means for frequency-dividing a source clock signal from said source clock generating means by a frequency dividing factor of N which is variable in a range of $n1 \geq N \geq n2$ wherein n1, n2 and N are positive integers and $n1 > n2$, and supplying an output signal to operate a digital operation system in a slave mode and a control means for controlling the frequency dividing factor of said first frequency dividing means to clock-synchronize an output signal of said first frequency dividing means with an input signal according to the phase relation between the output signal of said first frequency dividing means and the input signal; and
    a clock circuit including a second frequency dividing means for frequency-dividing the source clock signal from said source clock generating means by a predetermined dividing factor of n3 which is set to be substantially in a range of $n1 > n3 > n2$, and supplying an output signal to operate said digital operation system in a master mode.

2. A clock synchronization signal generating circuit according to claim 1 wherein n1 is set to a value larger than (n2+1).

3. A clock synchronization signal generating circuit according to claim 1 or 2 wherein said first frequency dividing means includes a scale variable counting circuit for counting a source clock signal from said source clock generating means and whose scale N is controlled by said control means, and a decoding circuit for decoding an output signal from said counting circuit.

4. A clock synchronization signal generating circuit according to claim 3 wherein said second frequency dividing means includes an n4-scale counting circuit in which n4 is an integer in a range of $n1 > n4 > n2$ and which counts a source clock signal from said source clock generating means, and a decoding circuit for decoding an output signal from said counting circuit.

5. A clock synchronization signal generating circuit according to claim 4 wherein said scale variable counting circuit generates a condition indicating signal when it comes to have a predetermined counting value in each of counting cycles, and said control means controls the scale of said scale variable counting circuit to be set according to the phase relation between said condition indicating signal and said input signal.

6. A clock synchronization signal generating circuit according to claim 4 further comprising an inhibit circuit for inhibiting the output signal of said scale variable counting circuit when said scale variable counting circuit comes to have contents different from predetermined counting contents.

7. A clock synchronization signal generating circuit according to claim 3 wherein said scale variable counting circuit generates a condition indicating signal when it comes to have a predetermined counting value in each of counting cycles, and said control means controls the scale of said scale variable counting circuit to be set according to the phase relation between said condition indicating signal and said input signal.

8. A clock synchronization signal generating circuit according to claim 3 further comprising an inhibit circuit for inhibiting the output signal of said scale variable counting circuit when said scale variable counting circuit comes to have contents different from predetermined counting contents.

9. A clock synchronization signal generating circuit according to claim 1 or 2 wherein said first frequency dividing means includes a first counting circuit of n2-scale for counting a source clock signal from said source clock generating means, a circuit for preventing said source clock signal from being supplied to said first counting circuit over an inhibition period of time defined by a control signal from said control means in each of counting cycles in said first counting circuit, and a decoding circuit for decoding an output signal from said first counting circuit.

10. A clock synchronization signal generating circuit according to claim 9 wherein said second frequency dividing means includes a second counting circuit of n4-scale in which n4 is an integer in a range of $n1 > n4 > n2$ and which counts a source clock signal from said source clock generating means, and a decoding circuit for decoding an output signal from said second counting circuit.

11. A clock synchronization signal generating circuit according to claim 10 wherein said first counting circuit generates a condition indicating signal when it comes to have a predetermined counting value in each of counting cycles, and said control means sets the length of said inhibition period of time to a predetermined value according to the phase relation between said condition indicating signal and said input signal.

12. A clock synchronization signal generating circuit according to claim 1 wherein n1 is set equal to (n2+1).

13. A clock synchronization signal generating circuit according to claim 12 wherein said second frequency dividing means includes a first scale variable counting circuit for operating as n3-scale counter counting selectively in n1- or n2-scale mode a source clock signal from said source clock generating means, and a decoding circuit for decoding an output signal of said first counting circuit.

14. A clock synchronization signal generating circuit according to claim 13 wherein said first frequency dividing means includes a second scale variable counting circuit for counting a source clock signal from said source clock generating means and whose scale N is controlled by said control means, and a decoding circuit for decoding an output signal from said second counting circuit.

15. A clock synchronization signal generating circuit according to claim 14 wherein said second scale variable counting circuit generates a condition indicating signal when it comes to have a predetermined counting value in each of counting cycles, and said control means controls the scale of said second scale variable counting circuit to be set according to the phase relation between said condition indicating signal and said input signal.

16. A clock synchronization signal generating circuit according to claim 14 further comprising a circuit for preventing the output signal of said second scale variable counting circuit when said second scale variable counting circuit has contents different from predetermined counting contents.

17. A clock synchronization signal generating circuit according to claim 1 wherein said second frequency dividing means includes a first scale variable counting circuit for operating substantially as n3-scale counter circuit to count selectively in at least two different scales a source clock signal from said source clock generating means, and a decoding circuit for decoding an output signal of said first counting circuit.

18. A clock synchronization signal generating circuit according to claim 17 wherein said first frequency dividing means includes a second scale variable counting circuit for counting a source clock signal from said source clock generating means and whose scale N is controlled by said control means, and a decoding circuit for decoding an output signal from said second counting circuit.

19. A clock synchronization signal generating circuit according to claim 18 wherein said second scale variable counting circuit generates a condition indicating signal when it comes to have a predetermined counting value in each of counting cycles, and said control means controls the scale of said second scale variable counting circuit to be set according to the phase relation between said condition indicating signal and said input signal.

20. A clock synchronization signal generating circuit according to claim 18 further comprising a circuit for preventing an output signal of said second scale variable counting circuit when said second scale variable counting circuit has contents different from predetermined counting contents.

21. A clock synchronization signal generating circuit comprising:
- a source clock generating means;
- a variable frequency dividing means for frequency-dividing a source clock signal from said source clock generating means by a frequency dividing factor of N which is variable in a range of $n1 > N > n2$ wherein n1, n2 and N are positive integers and $n1 > n2$; and
- a control means for supplying a first control signal to said variable frequency dividing means in first operation mode to set the frequency dividing factor of said variable frequency dividing means to a value of n3 larger than n2 but smaller than n1, and for supplying a second control signal to said variable frequency dividing means in second operation mode according to the phase relation between an input clock signal and an output signal from said variable frequency dividing means to control the frequency dividing factor of said variable frequency dividing means to clock-synchronize the output signal of said variable frequency dividing means with the input clock signal;
- said variable frequency dividing means includes a scale variable counting circuit for carrying out n4-scale counting operation responsive to the first control signal from said control means in which n4 is an integer in a range of $n1 > n4 > n2$ and whose scale N is controlled responsive to the second control signal from said control means, and a decoding circuit for decoding an output signal from said counting circuit.

22. A clock synchronization signal generating circuit according to claim 21 wherein said scale variable counting circuit generates a condition indicating signal when it comes to have a predetermined counting value in each of counting cycles, and said control means controls the scale of said scale variable counting circuit in second operation mode to be set according to the phase relation between said condition indicating signal and said input clock signal.

23. A clock synchronization signal generating circuit according to claim 21 further comprising a circuit for inhibiting the output signal of said scale variable counting circuit when said scale variable counting circuit has contents different from predetermined counting contents.

24. A clock synchronization signal generating circuit comprising:
- a source clock generating means;
- a variable frequency dividing means for frequency-dividing a source clock signal from said source clock generating means by a frequency dividing factor of N which is variable in a range of $n1 > N > n2$ wherein n1, n2 and N are positive integers and $n1 > n2$; and
- a control means for supplying a first control signal to said variable frequency dividing means in first operation mode to set the frequency dividing factor of said variable frequency dividing means to a value of n3 larger than n2 but smaller than n1, and for supplying a second control signal to said variable frequency dividing means in second operation mode according to the phase relation between an input clock signal and an output signal from said variable frequency dividing means to control the frequency dividing factor of said variable frequency dividing means to clock-synchronize the output signal of said variable frequency dividing means with the input clock signal;

said variable frequency dividing means includes a counting circuit of n2-scale for counting a source clock signal from said source clock generating means, a clock preventing circuit for preventing the source clock signal over a first preventing period defined by the first control signal supplied from said control means and over a second preventing period selectively defined by the second control signal supplied from said control means in each of counting cycles in said counting circuit, and a decoding circuit for decoding an output signal from said counting circuit.

25. A clock synchronization signal generating circuit according to claim 24 wherein said first counting circuit generates a condition indicating signal when it comes to have a predetermined counting value in each of counting cycles, and said control means sets in second operation mode the length of said preventing period to a predetermined value according to the phase relation between said condition indicating signal and said input clock signal.

26. A clock synchronization signal generating circuit according to claim 21 or 24 wherein n1 is set to a value larger than (n2+1).

* * * * *